US010074454B2

(12) United States Patent
Virtanen et al.

(10) Patent No.: US 10,074,454 B2
(45) Date of Patent: *Sep. 11, 2018

(54) METHOD FOR CORROSION PREVENTION

(71) Applicant: TESLA NANOCOATINGS, INC., Massillon, OH (US)

(72) Inventors: Jorma Antero Virtanen, Massillon, OH (US); Todd Hawkins, Massillon, OH (US)

(73) Assignee: Tesla NanoCoatings, Inc., Massillon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,980

(22) Filed: Mar. 28, 2018

(65) Prior Publication Data

US 2018/0218803 A1 Aug. 2, 2018

Related U.S. Application Data

(63) Continuation of application No. 13/600,939, filed on Aug. 31, 2012, now Pat. No. 9,953,739.

(60) Provisional application No. 61/529,471, filed on Aug. 31, 2011.

(51) Int. Cl.
| | |
|---|---|
| H01B 1/22 | (2006.01) |
| H01B 1/24 | (2006.01) |
| C09D 5/03 | (2006.01) |
| C09D 5/10 | (2006.01) |
| C09D 163/00 | (2006.01) |
| C09D 5/24 | (2006.01) |
| B05D 5/12 | (2006.01) |
| C23F 11/18 | (2006.01) |
| C08K 3/04 | (2006.01) |
| C08K 3/08 | (2006.01) |
| C09D 101/02 | (2006.01) |
| C09D 197/00 | (2006.01) |
| C23C 30/00 | (2006.01) |
| C08K 3/014 | (2018.01) |
| B82Y 30/00 | (2011.01) |

(52) U.S. Cl.
CPC ............... *H01B 1/22* (2013.01); *B05D 5/12* (2013.01); *C08K 3/014* (2018.01); *C08K 3/041* (2017.05); *C08K 3/08* (2013.01); *C09D 5/038* (2013.01); *C09D 5/10* (2013.01); *C09D 5/103* (2013.01); *C09D 5/106* (2013.01); *C09D 5/24* (2013.01); *C09D 101/02* (2013.01); *C09D 163/00* (2013.01); *C09D 197/005* (2013.01); *C23C 30/005* (2013.01); *C23F 11/18* (2013.01); *H01B 1/24* (2013.01); *B82Y 30/00* (2013.01); *C08K 3/04* (2013.01); *C08K 2003/0843* (2013.01); *C08K 2003/0862* (2013.01)

(58) Field of Classification Search
CPC .... H01B 1/20; H01B 1/22; H01B 1/24; C23F 11/00; C23F 11/04; C23F 11/06; C23F 11/08; C23F 11/10; C23F 11/12; C23F 11/18; C23F 11/185; C23F 11/187; C23F 13/005; C09D 5/038; C09D 5/08; C09D 5/10; C09D 5/103; C09D 5/106; C09D 5/24; C09D 101/00; C09D 101/02; C09D 101/04; C09D 101/06; C09D 163/00; C09D 197/005; C08K 3/014; C08K 3/04; C08K 3/041; C08K 3/042; C08K 3/043; C08K 3/044; C08K 3/045; C08K 3/046; C08K 3/08; C08K 2003/0843; C08K 2003/0862; C23C 30/005; B05D 5/12
See application file for complete search history.

(56) References Cited

U.S. PATENT DOCUMENTS

| | | | |
|---|---|---|---|
| 3,859,228 A | 1/1975 | Morishita et al. | |
| 4,324,717 A | 4/1982 | Layer | |
| 4,463,118 A | 7/1984 | Evans et al. | |
| 4,526,813 A * | 7/1985 | Wu | C09D 163/00 |
| | | | 166/902 |
| 4,767,829 A | 8/1988 | Kordomenos et al. | |
| 4,895,702 A | 1/1990 | Fischer | |
| 5,071,706 A | 12/1991 | Soper | |
| 5,589,523 A | 12/1996 | Sawaoka et al. | |
| 6,020,385 A | 2/2000 | Halle et al. | |
| 6,184,280 B1 | 2/2001 | Shibuta | |

(Continued)

FOREIGN PATENT DOCUMENTS

| | | |
|---|---|---|
| EP | 0 468 710 | 1/1992 |
| EP | 2 436 516 | 4/2012 |

(Continued)

OTHER PUBLICATIONS

Naguib, "Filing and Chemical Modification of Carbon Nanotubes with Polymers," Sep. 7-11, 2003, Paper 490 presented at the 226th ACS National Meeting US Dept of Health and Human Services, "Occupational Safety and Health Guideline for Ethylidene Norbornene," Public Health Service, Centers for Disease Control and Prevention, National Institute for Occupational Safety and Health Education and Information Division, Ethylidene Norbornene, 1995, pp. 1-8.

(Continued)

*Primary Examiner* — Harold Y Pyon
*Assistant Examiner* — Matthew R Diaz
(74) *Attorney, Agent, or Firm* — Emerson Thomson Bennett, LLC; Daniel A. Thompson

(57) ABSTRACT

The composition described herein for the prevention of corrosion comprises: sacrificial metal particles more noble than a metal substrate to which the composition contacts; carbonaceous material that can form electrical contact between the sacrificial metal particles; and means for providing an anticorrosion coating material for the metal substrate. The composition can form a coating on a metal substrate surface. A method for applying the composition for the prevention of corrosion is also described herein.

19 Claims, No Drawings

(56) References Cited

U.S. PATENT DOCUMENTS

| | | | |
|---|---|---|---|
| 6,235,856 | B1 | 5/2001 | Hafner et al. |
| 6,261,871 | B1 | 7/2001 | Langari et al. |
| 6,287,372 | B1 | 9/2001 | Briand et al. |
| 6,375,872 | B1 | 4/2002 | Chao |
| 6,479,167 | B2 | 11/2002 | Sumita et al. |
| 6,486,099 | B2 | 11/2002 | Igari et al. |
| 6,500,564 | B1 | 12/2002 | Shiobara et al. |
| 6,518,330 | B2 | 2/2003 | White et al. |
| 6,562,474 | B1 * | 5/2003 | Yoshimi .............. B05D 5/00 428/472.3 |
| 6,617,046 | B2 | 9/2003 | Noro et al. |
| 6,723,257 | B2 | 4/2004 | Libutti et al. |
| 6,858,659 | B2 | 2/2005 | White et al. |
| 7,045,562 | B2 | 5/2006 | Thiel et al. |
| 7,399,532 | B2 | 7/2008 | Seido et al. |
| 7,422,789 | B2 * | 9/2008 | Avakian ............... B82Y 30/00 205/687 |
| 7,727,420 | B2 | 8/2010 | Ward |
| 7,794,626 | B2 | 9/2010 | Horton |
| 7,851,022 | B2 | 12/2010 | Schwarz |
| 8,993,066 | B2 | 3/2015 | Yang et al. |
| 9,303,171 | B2 | 4/2016 | Virtanen |
| 9,982,145 | B2 | 5/2018 | Virtanen |
| 2002/0193040 | A1 | 12/2002 | Zhou |
| 2003/0060569 | A1 | 3/2003 | White et al. |
| 2003/0151030 | A1 * | 8/2003 | Gurin .................. B82Y 10/00 252/502 |
| 2004/0055688 | A1 | 3/2004 | Cowger et al. |
| 2004/0076681 | A1 | 4/2004 | Dennis et al. |
| 2004/0107866 | A1 * | 6/2004 | Bitzer ................. C09D 5/084 106/14.12 |
| 2004/0177451 | A1 | 9/2004 | Poulin et al. |
| 2005/0038173 | A1 | 2/2005 | Harris et al. |
| 2005/0137291 | A1 | 6/2005 | Schneider |
| 2005/0224764 | A1 | 10/2005 | Ma et al. |
| 2005/0272856 | A1 | 12/2005 | Cooper et al. |
| 2006/0166003 | A1 | 7/2006 | Khabashesku et al. |
| 2007/0087198 | A1 | 4/2007 | Dry |
| 2007/0292459 | A1 | 12/2007 | Cooper et al. |
| 2008/0292801 | A1 | 11/2008 | Shah et al. |
| 2009/0036568 | A1 | 2/2009 | Merle et al. |
| 2009/0090209 | A1 | 4/2009 | Chang |
| 2009/0202644 | A1 | 8/2009 | Gogotsi et al. |
| 2009/0224435 | A1 | 9/2009 | Gogotsi et al. |
| 2010/0120555 | A1 | 5/2010 | Huang |
| 2010/0167088 | A1 | 7/2010 | Chouai et al. |
| 2010/0255279 | A1 | 10/2010 | Hong |
| 2011/0033721 | A1 | 2/2011 | Rohatgi |

FOREIGN PATENT DOCUMENTS

| | | | |
|---|---|---|---|
| WO | 2003 060 035 | 7/2003 | |
| WO | 2010 062 002 | 6/2010 | |
| WO | WO 2010062002 A1 * | 6/2010 | ............ C09D 5/086 |
| WO | 2010 137 726 | 12/2010 | |
| WO | 2011 127 315 | 10/2011 | |

OTHER PUBLICATIONS

3M Electronics Markets Materials Division, "3M Fluorinert Liquids for Electronics manufacturing," Issued Dec. 3, 2003, pp. 1-4, 3M Center, Bldg 220-9E-11, St. Paul, MN 55144-1000 www.3m.com/electronics/chemicals.

Lee, et al., "Characterization of Dicyclopentadiene and 5-Ethylidene-2-norbornene as Self-Healing Agents for Polymer Composite and its Microcapsules," Macromolecular Research, vol. 12, No. 5, p. 478-483, 2004.

Unknown, O=CHem, Solvents, Apr. 19, 2012, http://web1.uct.usm.maine.edu/~newton/Chy251_253/Lectures/Solvents/Solvents.html, Solvents, p. 1-4.

White et al., "Autonomic Healing of Polymer Composites," Feb. 15, 2001, p. 794, Nature vol. 409 www.nature.com.

Brown, et al., "In Situ Poly (urea-formaldehyde) Microencapsulation of Dicyclopentadiene," p. 1-14, Journal of Microencapsulation.

Brown, at al, "Fracture and Fatigue Behavior of Self-Healing Polymer Composite," p. C11.22,1-6, Mat. Res. Soc. Symp. Proc., vol. 735 2003 Materials Research Society.

Kessler, et al, "Self-Healing Structural Composite Materiais," 2003, Elsevier, p. 743-753, Part A-34 www.sciencedirect.com.

Lvov, et al. "Halioysite Clay Nanotubes for Controlled Release of Protective Agents," ACSNano, online May 27, 2008, vol. 2, No. 5, p. 814-820, www.ascnano.org.

Xu, "1D Lanthanide Heide Crystals Inserted into Single-Walled Carbon Nanotubes," Chem, Commun., 2427-2428, 2000.

Carfagna, et el, "The Effect of the Prepolymer Composition of Amino-Hardened Epoxy Resins on the Water Sorption Behavior end Plasticization," Journal of Applied Polymer Science, vol. 27, 105-112, 1982.

Steel, "Hawley's Condensed Chemical Dictionary," 1177, 2007.

Berry, et al., "Ligonsulfonic Acid-Doped Poluaniline—a Versatile Conducting Polymer," Chemical Modification, Properties and Usage of Lignin, 21-40, 2002.

International Search Authority, "PCT International Search Report and Written Opinion," International Application No. PC/US2012/053389, dated Jun. 3, 2013.

Sastri, "Green Corrosion Inhibitors, Theory and Practice," John Wiley & Sons, Inc., New Jersey, 2011 See Attachments 8 through 18.

* cited by examiner

METHOD FOR CORROSION PREVENTION

This application is a continuation of U.S. Ser. No. 13/600,939, filed Aug. 31, 2012, entitled COMPOSITION FOR CORROSION PREVENTION, which claims priority to a provisional application having U.S. Ser. No. 61/529,471, entitled COMPOSITION FOR CORROSION PREVENTION, filed Aug. 31, 2011.

I. BACKGROUND

A. Field of Art

Described herein are compositions and methods that can prevent corrosion. More specifically, the compositions and methods described provide corrosion prevention of metal submerged in salt water and metal used in crude oil pipes.

B. Description of the Related Art

Corrosion is the inevitable gradual destruction of material, usually metal, by chemical reaction with its environment. These metals are mainly iron and steel, although many other metals may corrode as well. This corrosion is typically due to oxidation, which can be accelerated in the presence of moisture, to form a metal oxide. Many structural alloys corrode merely from exposure to moisture in the air, but the process can be strongly affected by exposure to certain substances. For example, when iron is exposed to moist air, it reacts with oxygen to form rust, $Fe_2O_3nH_2O$. Coating the surface of the iron-containing article may help to shield the article from the elements needed for the natural rusting reaction to begin.

Corrosion can be concentrated locally, or it can extend across a wide area more or less uniformly corroding the surface. Because corrosion is a diffusion controlled process, it occurs on exposed surfaces. The problem with iron as well as many other metals is that the oxide formed by oxidation does not firmly adhere to the surface of the metal and flakes off easily causing "pitting" and/or "cracking." Extensive pitting and/or cracking may eventually cause structural weakness, a decrease in luster, a decrease of electrical conductivity, and a disintegration of the metal. Because of this structural disintegration and weakening, the effects of corrosion may cost millions of dollars each year, with much of this loss from the corrosion of iron and steel.

II. SUMMARY

A new and improved composition for providing corrosion protection is described herein. One composition comprises: sacrificial metal particles more noble than a metal substrate to which the composition contacts; and carbonaceous material that can form electrical contact between the sacrificial metal particles; and a means for providing an anticorrosion coating material for the metal substrate.

Another aspect of the composition is to provide sacrificial metal particles that resist oxidation of iron(II) ion into iron(III) ion.

Still another aspect of the composition is to provide sacrificial metal particles that comprise at least one metal of nickel, cobalt, and/or molybdenum.

Still yet another aspect of the composition is to provide sacrificial metal particles that are microparticles or nanoparticles.

One aspect of the composition is to provide sacrificial metal particles that comprise about 0.00001% by weight to about 95% by weight of the composition.

Yet another aspect of the composition is to provide sacrificial metal particles that are regenerated.

Another aspect of the composition is to provide metal substrate that is at least one metal of iron, copper, nickel, titanium, silver, aluminum, steel, and/or stainless steel.

Still another aspect of the composition is to provide carbonaceous material that comprises graphitic carbon.

Yet another aspect of the composition is to provide graphitic carbon that comprises at least one graphitic carbon of microhorns, single-walled nanotubes, double-walled nanotubes, multi-walled nanotubes, graphite, and/or graphene.

Still yet another aspect of the composition is to provide carbonaceous material that is functionalized.

One aspect of the composition is to provide carbonaceous material that comprises about 0.1% by weight to about 20% by weight of the composition.

Another aspect of the composition is to provide carbonaceous material that comprises about 0.1% by weight to about 4% by weight of the composition.

Still another aspect of the composition is to provide a flowable material that is an anticorrosion coating material for the metal substrate.

Another aspect of the composition is to provide a flowable material comprising at least one polymer of polyacrylate, polyacrylonitrile, polybitumeate, polyethylene, polypropylene, polybutadiene, polyurea, polyamide, polyimide, polyurethane, polyvinylchloride, aspartates, fluoropolymers, silicone, siloxanes, rubber, and/or epoxy.

Yet another aspect of the composition is to provide a flowable material that is polymerized on the surface of a metal substrate.

Still yet another aspect of the composition is to provide a flowable material that is dissolved in at least one solvent. Another aspect of the composition is that the solvent is at least one solvent of dimethylformamide, dimethylsulfoxide, ethylene carbonate, acetonitrile, 2-propanol, acetone, butanone, ethyl acetate, and/or toluene.

Still another aspect of the composition is to provide a flowable material that is capable of forming a solid film or coating on the surface of the metal substrate.

Another aspect of the composition is to provide a powder coating that is an anticorrosion coating material for the metal substrate.

Still yet another aspect of the composition is to further provide the composition with cellulose.

One aspect of the composition is to provide the composition further comprising cellulose where the cellulose is functionalized cellulose and/or amorphous fragmented cellulose.

Another aspect of the composition is to further provide the composition with an antioxidant.

Another aspect of the composition is to provide antioxidants that comprise at least one antioxidant of hydrochinon, tannic acid, lignin, lignin fragments, polyunsaturated fats, esters of polyunsaturated fats, and/or pine oil.

Still another aspect of the composition is to further provide the composition with aluminum i-propoxide.

Yet another aspect of the composition is to further provide the composition with trimethyl borate.

Still yet another aspect of the composition is to further provide the composition with at least one ligand.

One aspect of the composition is to provide the ligand in which the ligand bonding comprising of at least one group of carboxylic, amino, hydroxyl amino, and/or cyano groups.

Yet another aspect of the composition is to further provide the composition with lead oxide.

Still another aspect of the composition is to further provide the composition with at least one compound of silica, alumina, titanium oxide, copper oxide, and/or tin oxide.

Still yet another aspect of the composition is to further provide the composition with at least one compound of silica, alumina, titanium oxide, copper oxide, and/or tin oxide is a microparticle or a nanoparticle.

Another aspect of the composition is to further provide the composition with sacrificial metal particles less noble than the metal substrate to which the composition contacts.

A method of protecting a metal substrate is also described herein comprising the step of applying and/or contacting the composition to a metal substrate wherein the composition comprises: sacrificial metal particles more noble than a metal substrate to which the composition contacts and carbonaceous material that can form electrical contact between the sacrificial metal particles, wherein the composition provides an anticorrosion coating material for metal.

Still another aspect of the composition is that the composition provides an anticorrosion coating material for metal comprising: a flowable material comprising epoxy functionalities; sacrificial metal particles more noble than a metal substrate to which the composition contacts comprising at least one metal of nickel and/or cobalt; carbonaceous material comprising multi-walled graphitic carbon that can form electrical contact between the sacrificial metal particles; an antioxidant comprising at least one antioxidant of hydrochinon, tannic acid, lignin, lignin fragments, polyunsaturated fats, esters of polyunsaturated fats, and/or pine oil; and means for providing an anticorrosion coating material for metal.

Still other benefits and advantages will become apparent to those skilled in the art to which it pertains upon a reading and understanding of the following detailed specification.

III. DETAILED DESCRIPTION

Referring now to the description, wherein the descriptions may be for purposes of illustrating embodiments only and not for purposes of limiting the same, the present application may aid in illustrating the composition and method described herein.

Corrosion is the gradual destruction of material, usually metals, by chemical reaction with its environment. Described herein is a composition and a method for the prevention of corrosion, including the corrosion of iron under salt water and in crude oil pipes. By preventing or at least reducing corrosion, there can be an elimination or reduction of damage to the metal substrate.

In assessing the potential for corrosion, the type of metal may be considered. Table A (below) shows a galvanic corrosion table, which provides a comparison of different metals for galvanic corrosion according to their relative activity in seawater. Although Table A only provides a sampling of metals, it should not be considered limiting as to the type of potential metals that could be used. The anodic metals at the top of Table A are least noble, whereas the metals at the bottom of Table A are cathodic, or most noble. The further apart the metals, the higher the risk of galvanic corrosion for the metal. For the metals listed in Table A, the voltage difference between two metals can drive the current flow to accelerate corrosion of the anodic metal. The two major factors affecting the severity of galvanic corrosion are: (1) the voltage difference between the two metals on the Galvanic Series and (2) the size of the exposed area of cathodic metal relative to that of the anodic metal. Corrosion of the anodic metal is both more rapid and more damaging as the voltage difference increases and as the cathode area increases relative to the anode area.

TABLE A

|  | Material | Approximate Reduction Potential $E°$ (V) |
|---|---|---|
| Anodic (least noble) | Potassium | −2.92 |
|  | Sodium | −2.71 |
| ↑ | Magnesium | −2.36 |
| Cathodic (most noble) | Beryllium | −1.70 |
|  | Aluminum | −1.66 |
|  | Zinc | −0.76 |
|  | Cadmium | −0.40 |
|  | Titanium | −0.34 |
|  | Cobalt | −0.28 |
|  | Nickel | −0.23 |
|  | Molybdenum | −0.15 |
|  | Tin | −0.14 |
|  | Lead | −0.13 |
|  | Copper | +0.15 |
|  | Silver | +0.80 |
|  | Gold | +1.50 |

A composition described herein may provide a means for providing an anticorrosion coating material for metal. The composition may comprise carbonaceous material that can form electrical contact between sacrificial metal particles, wherein the sacrificial metal particles can be more noble than a metal substrate to which the composition contacts. Also described is a method of protecting a metal substrate using the composition described herein, which comprises sacrificial metal particles more noble than a metal substrate to which the composition may be applied, and carbonaceous material that can form electrical contact between the sacrificial metal particles.

The list in Table A represents the potential to promote a corrosive reaction; however, the actual corrosion in each application can be difficult to predict. Typically, corrosion may be reduced or eliminated through the use of certain coatings with galvanic metals that offer sacrificial anodic protection. Nevertheless, the oxidation potentials provided, as seen in Table A, are measured in water solution for bare metals. However, the oxidation potentials may change when measured in polymeric matrices, especially if the polymer or added ligand coordinates with sacrificial and protected metal differently. Within these polymeric systems used for corrosion protection, including cathodic protective coatings that may contain polymeric matrices, the actual oxidation potentials may be different than the potentials provided in Table A. In order to provide the composition described herein, the oxidation potential can be measured within the polymeric matrices in order to determine whether it is more noble than the metal to be protected.

For the composition described herein, the sacrificial metal particles more noble than a metal substrate to be protected may be dispersed within the composition. These sacrificial metal particles can resist oxidation of iron(II) ion into iron(III) ion, which can provide protection from corrosion when they are more noble than a metal substrate to which the composition contacts. For example, these sacrificial metal particles may comprise at least one metal of nickel, cobalt, and/or molybdenum. Although the metal substrate may form a protective layer, the sacrificial metal particles more noble than a metal substrate to be protected may provide corrosion protection. For example, an iron substrate can form a hard protective layer of iron(II)oxide. The gradual slow thickening of iron(II)oxide layer may not be detrimental because an iron surface can be coated with the iron(II)oxide layer even before the composition described herein. The sacrificial metal particles more noble than a metal substrate to be protected may then prevent or at least reduce the further oxidation of iron(II)oxide into iron(III)oxide, since corrosion may only be formed when the iron(II)oxide is oxidized into iron(III)oxide. While some of these sacrificial metal particles can be oxidized, the particles may be on electric contact with the iron(II)oxide through the use of carbon nanotubes or other graphitic material where the underlying iron can be a semiconductor. The oxidation of the sacrificial metal particles more noble than a metal substrate to be protected can lead to a prevention or reduction of the sacrificial metal particles and a thickening of iron(II)oxide layer. Most notably, the formation of iron(III)oxide can be prevented or at least reduced.

In the composition, the sacrificial metal particles more noble than a metal substrate to be protected may comprise about 0.00001% by weight to about 95% by weight. The sacrificial metal particles more noble than a metal substrate can also be microparticles, which may be about 0.1 μm to about 300 μm in size. The sacrificial metal particles more noble than a metal substrate can also be nanoparticles, which may be about 1 nm and about 2500 nm in size. Where microparticles or nanoparticles are used, the composition of the sacrificial metal particles more noble than a metal substrate may be 0.00001% by weight. These sacrificial metal microparticles or nanoparticles may be easier to handle because they will not be so easily oxidized. Further, the sacrificial metal particles more noble than a metal substrate may be regenerated. Regeneration may provide a means to continuous corrosion prevention. The regeneration may be completed by a periodic external potential. Because of the regeneration option, the composition may only require a small amount of the sacrificial metal particles more noble than a metal substrate.

The metal substrate described herein may be at least one metal of iron, copper, nickel, titanium, silver, aluminum, steel and/or stainless steel, but is not limited to those listed herein. The metal substrate may comprise a variety of shapes and sizes. The metal substrate may also be protected with other coatings for the prevention of corrosion. The metal substrate may be cleaned prior to the application of the composition described herein.

The carbonaceous material of the composition may comprise graphitic carbon. The graphitic carbon may comprise at least one graphitic carbon of microhorns, single-walled nanotubes, double-walled nanotubes, multi-walled nanotubes (also can be referred to as MWNT), graphite, and/or graphene. For example, MWNT may be used. For the composition, a relatively small amount of a carbonaceous material can allow for adequate conductivity. The carbonaceous material may comprise about 0.01% by weight to about 20% by weight of the composition. Further, the carbonaceous material may comprise about 0.1% by weight to about 4% by weight of the composition. In order to obtain increased conductivity, a higher loading level of graphitic carbon may be needed. In addition to electrical conduction, graphitic carbon may add strength of the coating. Liquid, such as salt water, can seep though cracks under the coating and corrosion will spread around cracks, which may cause the coating to gradually peel off. The use of graphitic carbon can help to diminish and/or prevent cracks, therefore reducing corrosion. Additionally, the carbonaceous material can also be functionalized.

The composition described herein may also contain flowable material. The flowable material may be liquid. The flowable material may be a plastic or a resin. The flowable material may comprise at least one polymer of polyacrylate, polyacrylonitrile, polybitumeate, polyethylene, polypropylene, polybutadiene, polyurea, polyamide, polyimide, aspartates, fluoropolymers, polyurethane, polyvinylchloride, silicone, siloxanes, rubber, and/or epoxy. During the formation of oxide from metal, the volume of the metal particle can increase; therefore, some elastic material like a polymer may be added near these particles.

The flowable material can be capable of forming a solid film or coating on the metal substrate surface. In order to prevent or reduce corrosion, flowable material can be polymerized onto the metal surface of the substrate to be protected. The flowable material may also be melted. Furthermore, the flowable material may be dissolved in at least one solvent. The solvent(s) may include at least one solvent of dimethylformamide, dimethylsulfoxide, ethylene carbonate, acetonitrile, 2-propanol, acetone, butanone, ethyl acetate, and/or toluene. The solvents listed above are not limiting, and in some cases, a wide variety of solvents may be used. However, the health and/or safety aspects of a solvent may dictate which solvents may be used. Two component or multiple component resin systems can also be used in the composition described herein. With two component polymers, no solvent may be needed when least one component is liquid. Also in such cases when polymerization is done in situ, solvent can be the monomer itself. One example of this may be with some acrylates, where the solvent can be, for example, methylmethacrylate.

Many plastics or resins may be used as a flowable material in the coating, as described above. When plastics or resins of the composition are in liquid state prior to curing, graphitic carbon like MWNT can provide an electrically conducting path. However, when these plastic or resin materials solidify, the conductivity may disappear because the material can surround the graphitic carbon, separating the graphitic carbon from each other. This can be seen with epoxies, for instance. The separation can be prevented by using cellulose, functionalized cellulose, and/or amorphous fragmented cellulose as a carrier within the composition. These materials can wrap around the MWNT and prevent them from separation during curing.

Besides using a flowable material, the composition described can be capable of forming a solid film or coating without the use of a flowable material. For example, the non-flowable composition may be a powder coating. Providing various forms of the composition described herein can offer other potential applications and/or application methods for the composition.

Additionally, other additives may help to maintain electrical conductivity. Some examples can be aluminum isopropoxide and/or trimethyl borate. These additives that may help to maintain electrical conductivity can neutralize the surface charge of the MWNT so that Coulombic repulsion does not push them apart. Another additive that may be used is ligands. Ligands may also change the oxidation potentials to the extent that the galvanic order may change. If ligand binding with ion is strong, then oxidation may be facilitated. Carboxylic, amino, hydroxyl amino, and/or cyano groups can be examples of strong ligands. Thus, polyacrylic acid, polyallyl amine, amino hardened epoxy, and/or polycyano acrylate can serve as both polymeric matrix and ligands. Many of these ligands can further amplify the protecting effect of nickel and/or cobalt. Another additive, antioxidants, may also be optionally added into the composition. Nonlimiting examples of antioxidants can include hydrochinon, tannic acid, lignin and lignin fragments, polyunsaturated fatty acids and their esters, and/or pine oil. Also traditional corrosion prevention methods may be combined with the present method. For example, lead(II,II,IV)oxide may be a part of the composition. An iron plumbate layer may form on the surface of metallic iron. Iron plumbate can be hard, and further corrosion may be prevented or slowed down. The present composition can allow for a considerable reduction of lead content of the coating. The materials of the composition may be used wherever coatings will be used, including harsh applications such as marine coatings, coating of oil pipes, and/or chemical containers. In some applications, other kind of compounds such as silica, alumina, titanium oxide, copper oxide, and/or tin oxide may be added to increase hardness and/or biocidal capabilities. These compounds may be microparticles about 0.1 µm to about 300 µm in size. These compounds may also be nanoparticles about 1 nm and about 2500 nm in size. Additionally, the composition described herein may further comprise sacrificial metal particles less noble than the metal substrate to which the composition contacts. The sacrificial metal particles less noble than the metal substrate to which the composition contacts may include but is not limited to zinc, aluminum, and/or magnesium. The sacrificial metal particles less noble than a metal substrate can also be microparticles, which may be about 0.1 µm to about 300 µm in size. The sacrificial metal particles less noble than a metal substrate can also be nanoparticles about 1 nm and about 2500 nm in size. Where microparticles or nanoparticles are used, the composition of the sacrificial metal particles less noble than a metal substrate may be 0.00001% by weight. These sacrificial metal microparticles or nanoparticles less noble than a metal substrate may be easier to handle because they will not be so easily oxidized. Further, the sacrificial metal particles less noble than a metal substrate may be regenerated.

Also described is the method of protecting a metal substrate using a composition comprising sacrificial metal particles more noble than a metal substrate to which the composition contacts and carbonaceous material that can form electrical contact between the sacrificial metal particles. Within the method, the composition described herein can be applied to a metal substrate in order to protect it from corrosion. The composition may be a flowable material or a powder coating. The method may be used separately or in addition to other method(s) that may be used for corrosion protection. The method may also be repeated at least once. The method may also be used to prevent or reduce further corrosion that may have already occurred on a metal substrate.

The embodiments have been described, hereinabove. It will be apparent to those skilled in the art that the above composition and method may incorporate changes and modifications without departing from the general scope. It is intended to include all such modifications and alterations in so far as they come within the scope of the appended claims or the equivalents thereof.

Having thus described the composition and method, it is now claimed:

1. A method for protecting a substrate, the method comprising:
    providing sacrificial metal particles, wherein the sacrificial metal particles comprise at least one metal of nickel, cobalt or molybdenum;
    forming an electrical contact between the sacrificial metal particles with a carbonaceous material;
    providing a polymeric matrix, wherein the polymeric matrix comprises at least one amino hardened epoxy;
    providing a metal substrate, wherein the metal substrate contains iron, wherein the iron has a surface layer of iron (II) oxide, wherein the sacrificial metal particles have a higher reduction potential than the metal substrate;
    mixing the sacrificial metal particles and the carbonaceous material into the polymeric matrix; and
    after mixing, applying the polymeric matrix to the surface layer of iron (II) oxide thereby preventing oxidation of the layer of iron (II) oxide from an iron (II) to an iron (III).

2. The method of claim 1, wherein the sacrificial metal particles are microparticles or nanoparticles.

3. The method of claim 1, wherein the sacrificial metal particles comprise 0.00001% by weight to about 95% by weight of the mixture of sacrificial metal particles, carbonaceous material, and polymeric matrix.

4. The method of claim 1, wherein the carbonaceous material comprises graphitic carbon.

5. The method of claim 4, wherein the graphitic carbon comprises at least one graphitic carbon of microhorns, single-walled nanotubes, double-walled nanotubes, multi-walled nanotubes, graphite, and graphene.

6. The method of claim 1, wherein the carbonaceous material is functionalized, wherein the carbonaceous material comprises about 0.1% by weight to about 20% by weight of the mixture of sacrificial metal particles, carbonaceous material, and polymeric matrix.

7. The method of claim 1, wherein the polymeric matrix further comprises a flowable material.

8. The method of claim 7, wherein the flowable material comprises at least one polymer of polyacrylate, polyacrylonitrile, polybitumeate, polyethylene, polypropylene, polybutadiene, polyurea, polyamide, polyimide, polyurethane, polyvinylchloride, aspartates, fluoropolymers, silicone, siloxanes, rubber, and epoxy.

9. The method of claim 7, wherein the flowable material forms a solid film or coating on the surface layer of iron (II) oxide.

10. The method of claim 1, wherein the combination of the sacrificial metal particles, the polymeric matrix, and the carbonaceous material is a powder coating that forms a solid film or coating on the surface layer of iron (II) oxide.

11. The method of claim 1, wherein the method further comprises:
    providing cellulose, wherein the cellulose comprises at least one cellulose of functionalized cellulose and amorphous fragmented cellulose, and mixing the cellulose into the polymeric matrix.

12. The method of claim 1, wherein the method further comprises:
    providing an antioxidant, wherein the antioxidants comprise at least one antioxidant of hydrochinon, tannic acid, lignin, lignin fragments, polyunsaturated fats, esters of polyunsaturated fats, and pine oil, and mixing the antioxidant into the polymeric matrix.

13. The method of claim 1, wherein the method further comprises:
    providing at least one of the group consisting of aluminum i-propoxide, trimethyl borate, and lead oxide, and mixing the at least one of the group consisting of aluminum i-propoxide, trimethyl borate, and lead oxide into the polymeric matrix.

14. The method of claim 1, wherein the method further comprises:

providing at least one compound of the group consisting of silica, alumina, titanium oxide, copper oxide, and tin oxide, wherein the at least one compound of silica, alumina, titanium oxide, copper oxide, and tin oxide is a microparticle or nanoparticle, and mixing the at least one compound of the group consisting of silica, alumina, titanium oxide, copper oxide and tin oxide into the polymeric matrix.

15. The method of claim 1, wherein the method further comprises:
providing a second set of sacrificial metal particles, wherein the second set of sacrificial metal particles have a lower reduction potential than the metal substrate, wherein the second set of sacrificial metal particles are at least one of the group consisting of zinc, aluminum, and magnesium, and mixing the second set of sacrificial metal particles into the polymeric matrix.

16. The method of claim 1, wherein the sacrificial metal particles are molybdenum.

17. The method of claim 1, wherein the metal substrate further comprises at least one metal of titanium, nickel, aluminum, steel, and stainless steel.

18. A method for providing an anticorrosion coating material for metal comprising:
providing a flowable material comprising epoxy functionalities;
providing a metal substrate, wherein the metal substrate contains iron, wherein the iron has a layer of iron (II) oxide;
providing sacrificial metal particles, the sacrificial metal particles comprising at least one metal of nickel and cobalt;
forming an electrical contact between the sacrificial metal particles with a carbonaceous material, wherein the carbonaceous material is multi-walled graphitic carbon;
providing a polymeric matrix, wherein the polymeric matrix comprises at least one amino hardened epoxy;
providing an antioxidant comprising at least one antioxidant of hydrochinon, tannic acid, lignin, lignin fragments, polyunsaturated fats, esters of polyunsaturated fats, and pine oil; and
applying the flowable material, the carbonaceous material, the polymeric matrix, the sacrificial metal particles, and the antioxidant as a layer on top of the layer of iron (II) oxide, thereby preventing oxidation of the layer of iron (II) oxide on the substrate from an iron (II) to an iron (III).

19. The method of claim 18, wherein the metal substrate further comprises at least one metal of titanium, nickel, aluminum, steel, and stainless steel.

* * * * *